United States Patent [19]

John et al.

[11] Patent Number: 5,111,691

[45] Date of Patent: May 12, 1992

[54] CONDUCTANCE/THERMAL LIMIT CONTROL APPARATUS AND METHOD

[75] Inventors: Robert S. John, Deerfield; Jack R. Piper, Mount Prospect, both of Ill.

[73] Assignee: ITT Corporation, New York, N.Y.

[21] Appl. No.: 630,912

[22] Filed: Dec. 20, 1990

[51] Int. Cl.[5] ............... G01F 23/00; G01K 13/02
[52] U.S. Cl. ................... 73/292; 374/142; 122/504; 340/620; 340/622
[58] Field of Search ............ 73/292, 304 R; 374/141, 374/142, 178, 179, 183; 122/504, 504.2; 340/618, 620, 622

[56] References Cited

U.S. PATENT DOCUMENTS

| | | | |
|---|---|---|---|
| 3,477,290 | 11/1969 | Lerner | 73/292 |
| 3,975,582 | 8/1976 | Ford | 73/304 R X |
| 4,007,713 | 2/1977 | DeLeonardis | 122/504 |
| 4,027,172 | 5/1977 | Hamelink | 73/304 R X |
| 4,196,341 | 4/1980 | Williams | 122/504.2 X |
| 4,256,258 | 3/1981 | Sekiya | 122/504.2 X |
| 4,259,982 | 4/1981 | Bartels | 73/304 R X |
| 4,263,587 | 4/1981 | John | 73/304 R X |
| 4,313,102 | 1/1982 | Broetto | 340/622 |
| 4,929,930 | 5/1990 | Rezabek | 340/622 |

FOREIGN PATENT DOCUMENTS 8300765 3/1983 European Pat. Off. ............ 340/622

OTHER PUBLICATIONS

Solitech-Series TL Combination Controls Temperature & Liquid Level Control With Single Sensor in one package.

Primary Examiner—Allan N. Shoap
Assistant Examiner—G. Bradley Bennett
Attorney, Agent, or Firm—Menotti J. Lombardi

[57] ABSTRACT

A probe which mounts in a liquid container has a conductance electrode containing a temperature sensor. A conductance control circuit is coupled to the probe to control an output relay in accordance with predetermined impedance conditions at the probe, and a temperature limit control circuit also controls the output relay in accordance with predetermined temperature conditions at the probe.

6 Claims, 2 Drawing Sheets

CONDUCTANCE/THERMAL LIMIT CONTROL APPARATUS AND METHOD

CROSS-REFERENCE TO RELATED APPLICATION

This application is related to U.S. application Ser. No. 508,147, filed Apr. 11, 1990, entitled "Method and Apparatus For Liquid Level Conductance Probe Control With Increased Sensitivity", and assigned to the assignee of this application.

BACKGROUND OF THE INVENTION

This invention relates to low water cutoff conductance probe controls, and more particularly to a conductance probe and control with both temperature setpoint and differential adjustment. As known in the prior art, the operation of a steam boiler is controlled by pressure and a low water cutoff control. One type of low water cutoff control is known from U.S. Pat. No. 4,263,587 (John). Sometimes, a high limit temperature safety control is also utilized. Hot water boilers are controlled by an aquastat temperature control, and on higher BTU capacity boilers, a low water cutoff is required. Typically, these are separate controls, each control requiring a separate mounting hole or fitting in the boiler shell.

SUMMARY OF THE INVENTION

An object of the invention is to provide control apparatus which simplifies boiler installation by combining the functions of low water cutoff control and temperature control in a single unit.

Another object is to improve reliability of the boiler installation by reducing the number of relay control elements otherwise needed when separate controls are utilized.

According to the broader aspects of the invention, a temperature sensor is contained within the conductance probe electrode, and two circuit portions responsive to the impedance and temperature conditions at the probe control the operation of the output relay.

BRIEF DESCRIPTION OF THE DRAWINGS

Other objects and advantages of the invention will become more fully apparent from the following description of the preferred embodiment, the appended claims and the accompanying drawings in which:

DESCRIPTION OF THE PREFERRED EMBODIMENT

Figure 1:
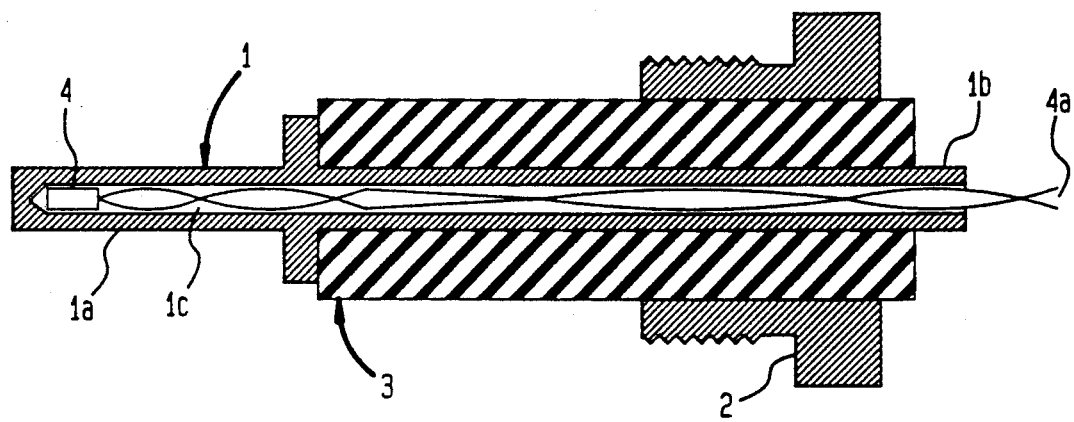
FIG. 1 illustrates the general construction of the combination sensor and probe.

Referring now to FIG. 1, a cross-sectional view of the probe according to the invention is illustrated. The electrode 1 which has a tip end 1a and signal out end 1b is insulated from the thread shell 2 by an insulator 3. The shell 2 provides a signal return connection to the container (not illustrated) which is made of conductive material. Electrode 1 includes a tubular hole 1c, the diameter of which is sufficient to allow insertion of a temperature sensor 4 which is connected by leads 4a to the control circuit hereinafter described. The temperature sensor 4 may be a thermocouple, an RTD sensor, or a semi-conductor device which can be thermally coupled to the probe electrode by suitable greases or encapsulants. A semi-conductor sensor device would be preferred due to generally higher signal level, simpler detection circuitry and better immunity to noise than other sensor types. The placement of the temperature sensor at the tip portion of the electrode allows excellent sensing of the water temperature at a favorable region in the boiler.

Figure 2:
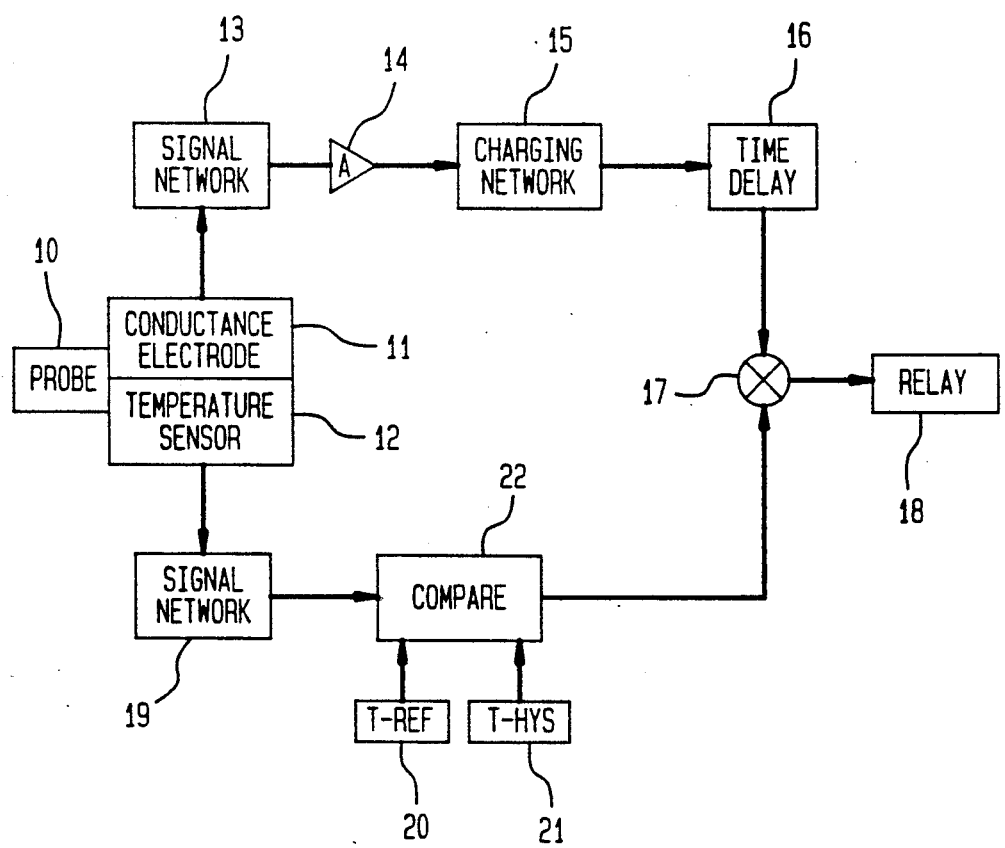
FIG. 2 is a block diagram of the control apparatus of the invention.

FIG. 2 is a block diagram of the control apparatus according to the invention. The probe 10 includes a conductance electrode 11 and temperature sensor 12. The electrode 11 is coupled to a signal network 13 whose output is coupled by amplifier 14 to charging network 15. The charging network output is coupled to a time delay 16. The time delay 16 is coupled to a summing circuit 17, the output of which energizes relay 18.

Signal network 19 receives the signal from the temperature sensor 12 and couples it to comparator 22 which has a temperature reference input 20 and a temperature difference reference input 21. The output of comparator 22 is also coupled to summing circuit 17.

As shown, the block diagram of FIG. 2 illustrates the functions in the control, including an electronic conductance control section with time delay function, and a temperature limit control section. Both probe portions 11,12 must be within prescribed operating limits in order for the output relay 18 to operate the boiler burner as intended. The conductance section comprising blocks 11 to 16 monitors the probe signal to determine whether water is present or not present, as determined by conductivity and water level at the probe. In a conductance probe control, an AC signal is applied through the water path between boiler shell (ground) and probe electrode 11. An electric current results whose value depends on the conductance of the water path. This probe signal is scaled to circuit values in signal network 13, and then amplified by 14. The amplifier output is applied to control the timer charging network 15, with circuit constants adjusted such that the output relay 18 is turned off if the water impedance at the probe exceeds the maximum preset value.

Independently, the temperature sensor 12 monitors the probe temperature against the limit value set in temperature reference 20. Differential temperature feedback 21 is included to prevent an unstable output at the set point. The sensor signal is scaled in signal network 19 to the circuit values, and then compared in comparator 22 with the set temperature limit value of reference 20. If the sensor signal exceeds the set limit value, the output relay is turned off.

Figure 3:
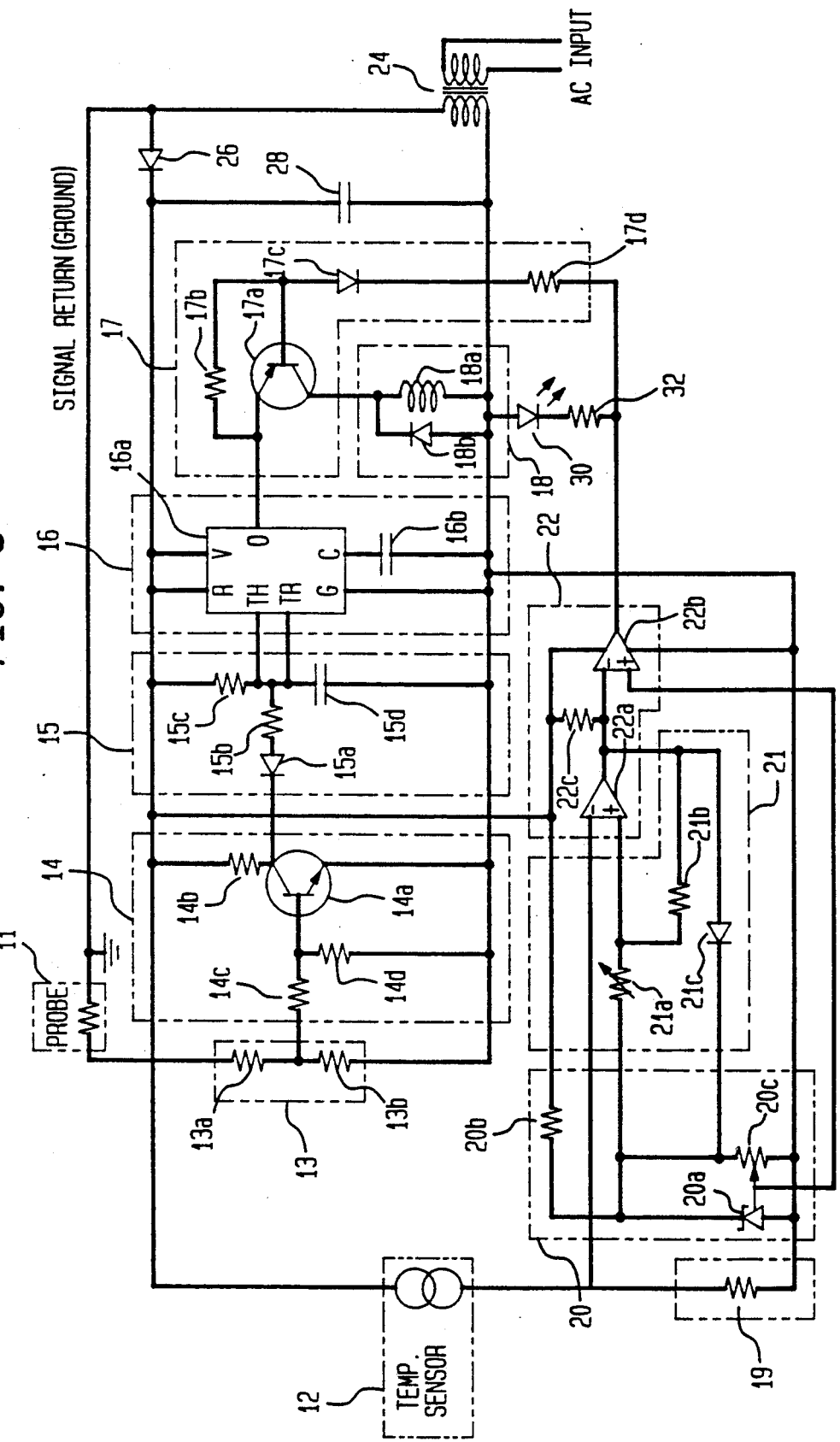
FIG. 3 is a schematic diagram of the block diagram of FIG. 2.

Referring now to FIG. 3, the probe includes a conductive electrode 11 and temperature sensor 12. Signal network 13 includes resistors 13a,b, and amplifier circuit 14 includes transistor 14a, and resistors 14b,c,d. The charging network 15 comprises diode 15a, resistors 15b,c and capacitor 15d. Time delay 16 includes integrated circuit (IC) 16a and capacitor 16b. Summing circuit 17 comprises transistor 17a, resistor 17b, diode 17c and resistor 17d. Relay 18 has its relay coil 18a shunted by diode 18b.

Signal network resistor 19 is coupled from temperature sensor 12 to comparator circuit 22 formed by operational amplifiers 22a,b and resistor 22c. Circuit 22 has an input from temperature reference set circuit 20 comprising zener diode 20a, resistor 20b and variable resistor 20c, and from temperature hysteresis reference circuit 21 comprising variable resistor 21a, resistor 21b and diode 21c.

AC input source (115 volts, 60 cycles) is coupled to transformer 24 whose secondary supplies circuit power via diode 26 and capacitor 28. LED 30 in series with resistor 32 indicates when the probe temperature is below the set limit.

The circuit diagram of FIG. 3 shows an example of an interconnected low water/temperature limit control. The low water cutoff portion comprising the transistor 14 and timer IC 16 is similar to commercially available controls such as that described in U.S. Pat. No. 4,263,587 (John). Here, the input resistance-capacitance charging network 15C,D of monostable timing circuit 16 is controlled by a transistor amplifier 14 from the AC input signal from the probe 11. With water present at the probe, input AC signals pulse the transistor 14A input base. This causes the transistor collector to produce inverted pulses. These are applied via the coupling diode 15A/resistor 15B to keep the timing capacitor 15d at a low voltage level. The timer IC output therefore remains at a high level to the relay input circuit 17. The time delay 16 output actuates the relay 18 via a transistor 17A from the temperature limit control circuit. Current from sensor 12 is converted to a voltage signal by a resistor 19, then applied to a comparator input 22A. The reference input for the comparator is a voltage representing the temperature limit value desired, and may be either a fixed value or a variable value, set with a potentiometer 20C. The comparator 22A also has a feedback loop 21 which produces a fixed or variable amount of hysteresis in the retrace of the input signals, included to avoid ,hunting, in the output. When the sensed temperature is higher than the set limit value, transistor 17A in series with the output relay 18 turns off, and the relay cannot operate. When the temperature is lower than the set limit value, the transistor 17A is switched on by the output of second comparator 22B, and the relay operation is then controlled by the timer 16 output.

The preferred temperature sensor 12 is an Analog Devices Inc. type having a current output of 1 microampere per degree kelvin. This output is converted by the 18K load resistor into a 10 millivolt per degree Fahrenheit absolute signal to the comparator 22A. The other or reference comparator input is furnished by an adjustable voltage reference source 20A. The reference voltage is adjusted with the potentiometer 20C to conform to the absolute temperature desired as the set point. When the sensor 12 temperature becomes higher than the set point, the first comparator 22A output moves from high to low level. The second comparator 22B serves to sharpen and invert the output from the first comparator. The second comparator output is applied to the base of the PNP transistor 17A to enable relay coil operation whenever the timer 16 output is at high level. This condition only occurs when both the water level and temperature are within proper limits.

Other means of accomplishing these circuit objectives will be apparent to those skilled in these arts.

Typical values for the components shown in the circuit diagram are as follows:

12—AD590F
13a—6.2K ohms
13b—390 ohms
14a—2N3904
14b—33K ohms
14c—10K ohms
14d—100K ohms
15a—IN4148
15b—33K ohms
15c—2M ohms
15d—4.7 MFD
16a—NE555
16b—0.01 MFD
17a—MPS3702
17b—100K ohms
17c—IN4148
17d—15K ohms
18a—Relay #ITT LZ12H
18b—IN4002
19—18K ohms
20a—TL431
20b—2.7K ohms
20c—50K ohms
21a—10K ohms
21b—1.2M ohms
21c—IN4148
22a,b—LM393
22c—5.6K ohms
24—12 VAC output
26—IN4002
28—470 MFD
30—LED (2mA rated)
32—6.8K ohoms With the typical values for components indicated the following operating characteristics may be achieved:

Temperature set: 100°–250° F. or a fixed high limit to any high temperature protection against a run away burner on a boiler.

Hysteresis temperature: 5°–30° F.

Probe impedance: 0–3000 OHM @12 VAC/60 Hz applied

Boiler pressure: 15 psi maximum

Ambient temperature: 120° F.

While the present invention has been disclosed in connection with a preferred embodiment thereof, it should be understood that there may be other embodiments which fall within the spirit and scope of the invention as defined by the following claims.

What is claimed is:

1. Control apparatus for simultaneously sensing liquid conductance and liquid temperature in a liquid container comprising:

a probe having a conductance electrode and temperature sensor contained therein, and said probe having an electrically conductive threaded shell insulated from said electrode and being adapted for insertion in a liquid container;

conductance control means coupled to said conductance electrode to receive a liquid impedance signal and determine if said signal representing the liquid impedance at said probe exceeds a predetermined value;

temperature limit control means coupled to said sensor to receive a temperature indication signal and determine if said temperature indication signal representing the liquid temperature exceeds a predetermined limit value;

a relay controlled by said conductance controls means and said temperature limit control means; and said conductance control means includes a conductance signal network for receiving said conductance signal, an amplifier coupled between said network and a charging network, and a time delay circuit coupled to receive an output signal from said charging network.

2. Control apparatus of claim 1 wherein said temperature limit control means includes:
 a temperature signal network for receiving said temperature signal;
 comparator means coupled to receive an output from said temperature signal network; and
 said comparator having a temperature reference input and a temperature difference reference input.

3. Control apparatus of claim 1 including a summing circuit for receiving a time delay circuit output to enable energizing said relay.

4. Control apparatus of claim 2 including a summing circuit for receiving a comparator means output to enable energizing said relay.

5. In a boiler having a conductance probe with a temperature sensor contained therein mounted in the boiler shell, a method to simultaneously monitor the water level and temperature in the boiler comprising the steps of:
 inserting an AC signal in the water path between the boiler shell and said conductance probe;
 coupling a conductance probe signal representative of the conductance of the water path to a signal network and following amplifier;
 applying the amplifier output to a timer charging network having preset circuit constants for indicating if the water impedance at the probe exceeds a maximum preset value;
 coupling the output of said charging network to a time delay circuit;
 sensing the temperature of the water at said probe and coupling a signal representative of the sensed temperature to a temperature signal network;
 comparing an output from said temperature signal network with a preset temperature limit value;
 receiving in a summing circuit an output from said delay circuit and an output from said temperature signal network; and
 turning off an output relay if the water impedance at the probe exceeds a maximum preset value, or if the temperature at the probe exceeds the set limit value.

6. In combination:
 a probe having a conductance electrode and temperature sensor, said probe being adapted for location in a boiler;
 conductance control means being coupled to said conductance electrode to receive a signal representing the liquid impedance and determining if said signal at said probe location exceeds a predetermined value, said conductance control means includes a conductance signal network for receiving said signal, an amplifier coupled between said network and a charging network, and a time delay circuit coupled to receive an output signal from said charging network,
 temperature limit control means being coupled to said sensor to receive another signal representing the liquid temperature and determining if said other signal exceeds a limit value, said temperature limit control means includes a temperature signal network for receiving said other signal, comparator means coupled to receive an output from said temperature signal network, and said comparator having a temperature reference input and a temperature difference reference input; and
 relay means being coupled to said conductance control means and said limit control means, said relay means being de-energized when said signal or other signal exceeds said predetermined or limit value, and a summing circuit coupled to said time delay circuit and to said comparator means to energize and de-energize said relay means.

* * * * *